(12) United States Patent
Kotin

(10) Patent No.: US 10,379,425 B1
(45) Date of Patent: Aug. 13, 2019

(54) FENCE-MOUNTABLE CAMERA HOLDER

(71) Applicant: Merlyn Associates, Inc., Tustin, CA (US)

(72) Inventor: Jay S. Kotin, Irvine, CA (US)

(73) Assignee: MERLYN ASSOCIATES, INC., Tustin, CA (US)

( * ) Notice: Subject to any disclaimer, the term of this patent is extended or adjusted under 35 U.S.C. 154(b) by 0 days.

(21) Appl. No.: 16/010,261

(22) Filed: Jun. 15, 2018

(51) Int. Cl.
*G03B 17/56* (2006.01)
*F16M 13/02* (2006.01)
*E04H 17/02* (2006.01)

(52) U.S. Cl.
CPC ......... *G03B 17/561* (2013.01); *F16M 13/022* (2013.01); *E04H 17/02* (2013.01)

(58) Field of Classification Search
None
See application file for complete search history.

(56) References Cited

U.S. PATENT DOCUMENTS

| | | | |
|---|---|---|---|
| 4,582,284 A | 4/1986 | Veenstra | |
| 5,260,731 A | 11/1993 | Baker, Jr. | |
| 5,294,005 A | 3/1994 | Hedges | |
| 5,538,212 A | 7/1996 | Kennedy | |
| 5,582,377 A | 12/1996 | Quesada | |
| 6,655,052 B2 | 12/2003 | Bruce | |
| 6,991,384 B1 | 1/2006 | Davis | |
| D546,366 S | 7/2007 | Dittmer | |
| D622,585 S | 8/2010 | Walker, Jr. | |
| 8,152,389 B1 | 4/2012 | Lammens | |
| 9,108,096 B2 | 8/2015 | Solheim et al. | |
| 9,201,291 B2 | 12/2015 | Jorgenson | |
| 9,386,196 B1 | 7/2016 | Fromm | |
| 9,696,610 B2 | 7/2017 | Truesdale | |
| 2009/0010637 A1 | 1/2009 | DeWitt | |
| 2009/0129769 A1 | 5/2009 | Broberg | |
| 2015/0253650 A1* | 9/2015 | Huang | F16M 13/022 348/376 |
| 2017/0075199 A1* | 3/2017 | Buttimer | G03B 17/563 |

OTHER PUBLICATIONS

LynkSpyder; Standard Model; 2015; https://www.lynkspyder.com/.
Backstop Camera Mount; http://www.backstopcameramount.com/.
The QM-1 Tennis camera Mount That's Incredibly Easy to Use; http://mytennistools.com/product/qm-1-portable-camera-mount/.
Hildozine Transceiver Caddy's; https://www.hildozine.com/.

* cited by examiner

*Primary Examiner* — William B Perkey
(74) *Attorney, Agent, or Firm* — Klein, O'Neill & Singh, LLP

(57) ABSTRACT

A device for mounting a camera to a chain link fence or the like, wherein the device includes an L-bracket with a vertical leg and a horizontal leg joined to each other an angled juncture, the vertical leg extending downward from the juncture and having a front side and a back side. A fixation element is attachable to the back side of the vertical leg from the front side of the vertical leg and is configured so that, in use, when the fixation element is engaged against the front side of the fence and the front surface of the vertical leg is engaged against the back side of the fence, the attachment of the fixation element to the back side of the vertical leg through an opening in the fence secures the fence between the fixation element and the vertical leg.

42 Claims, 13 Drawing Sheets

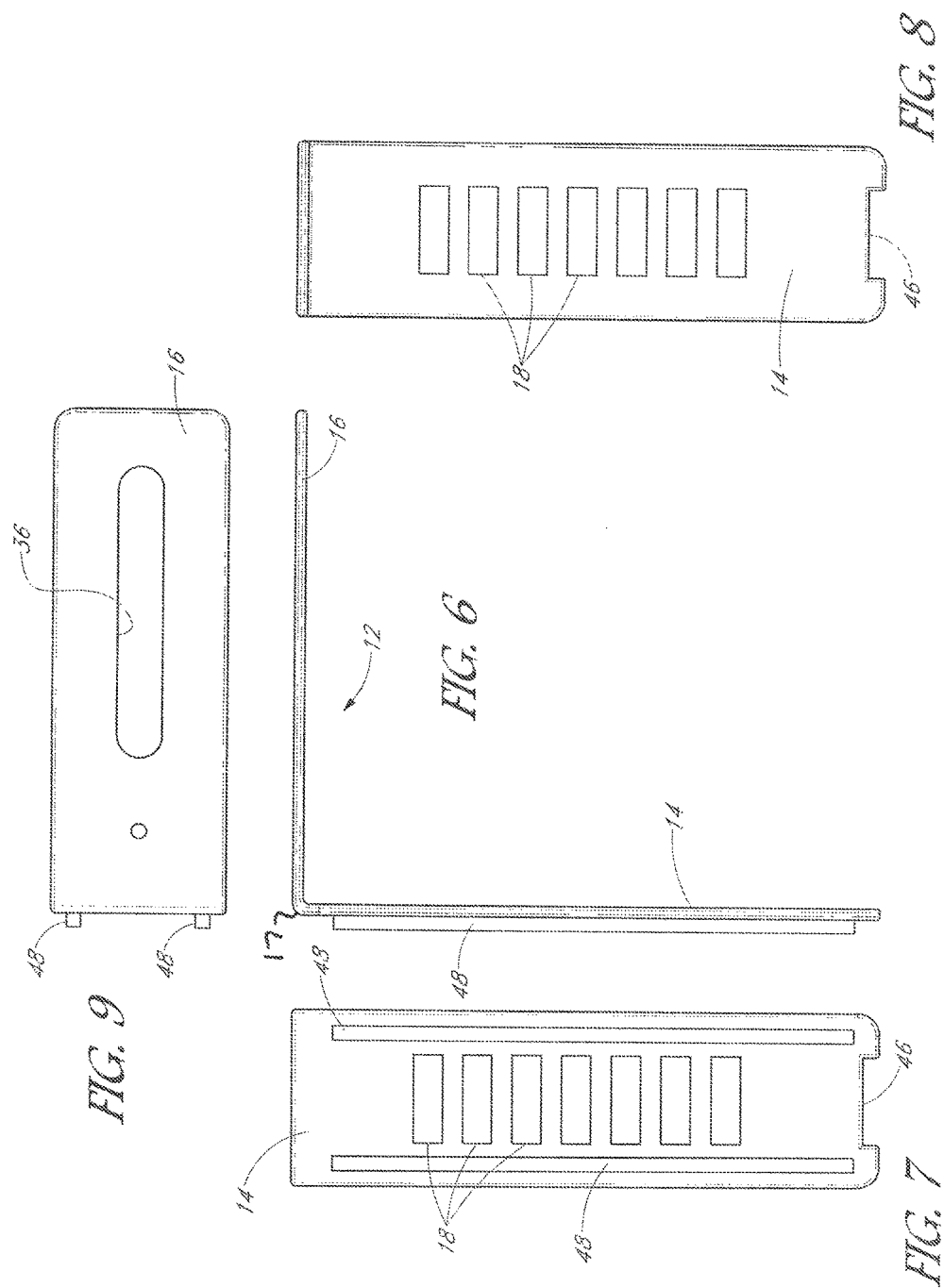

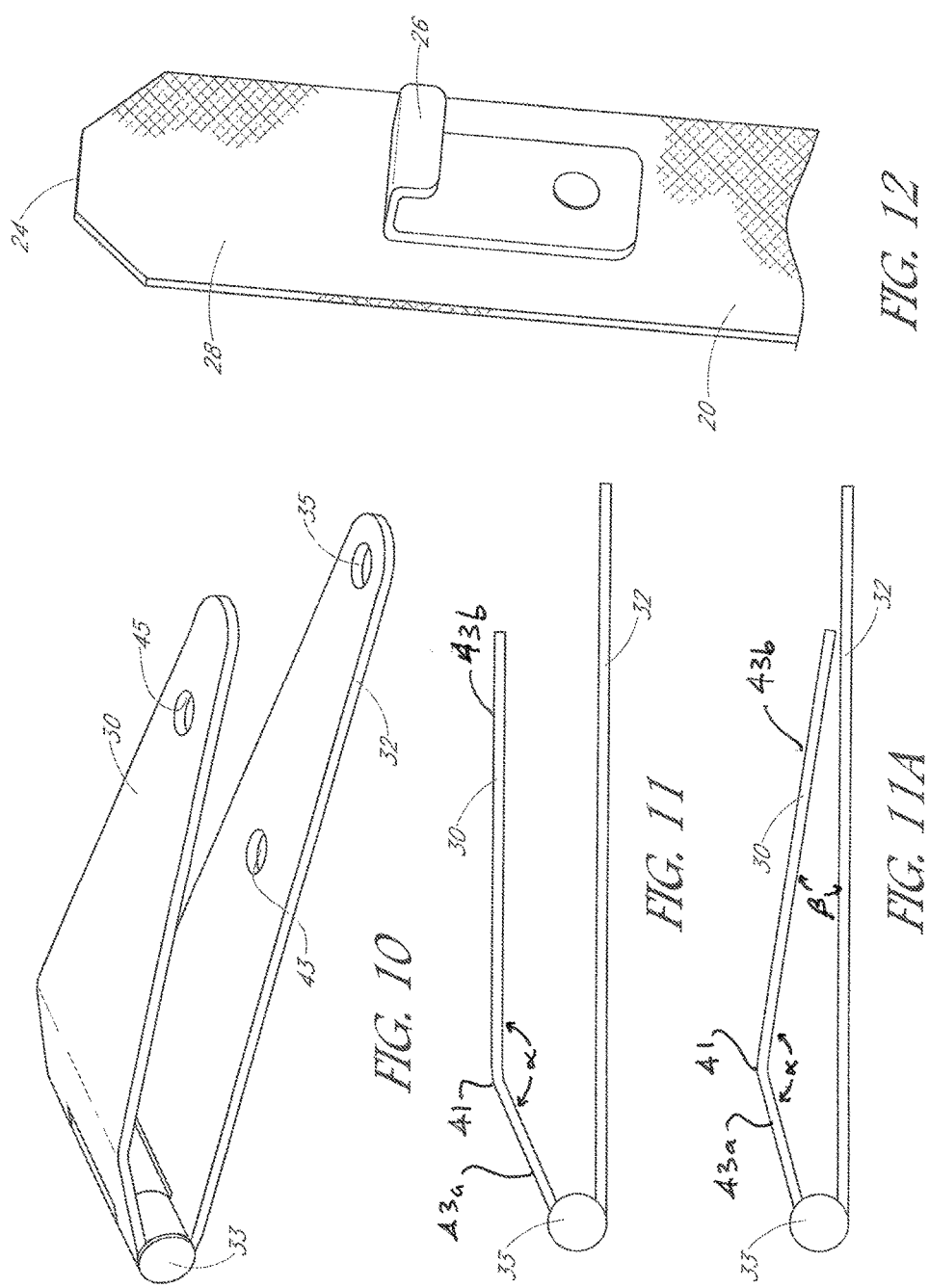

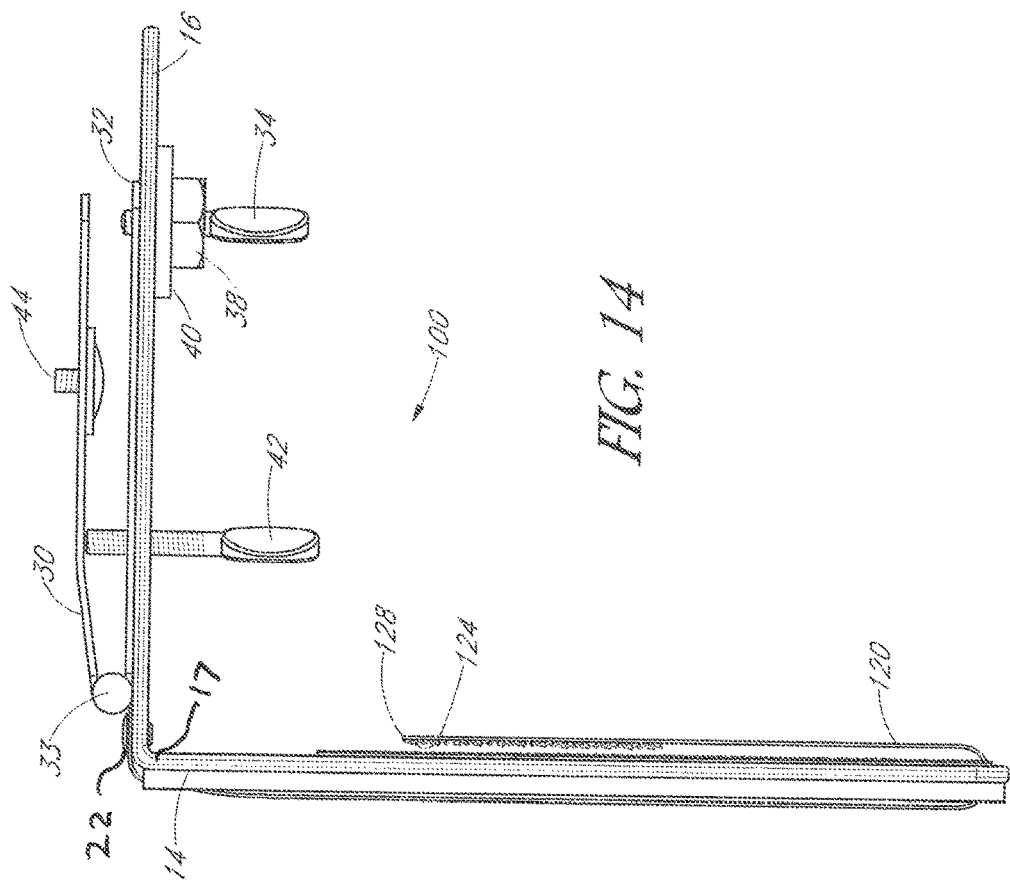
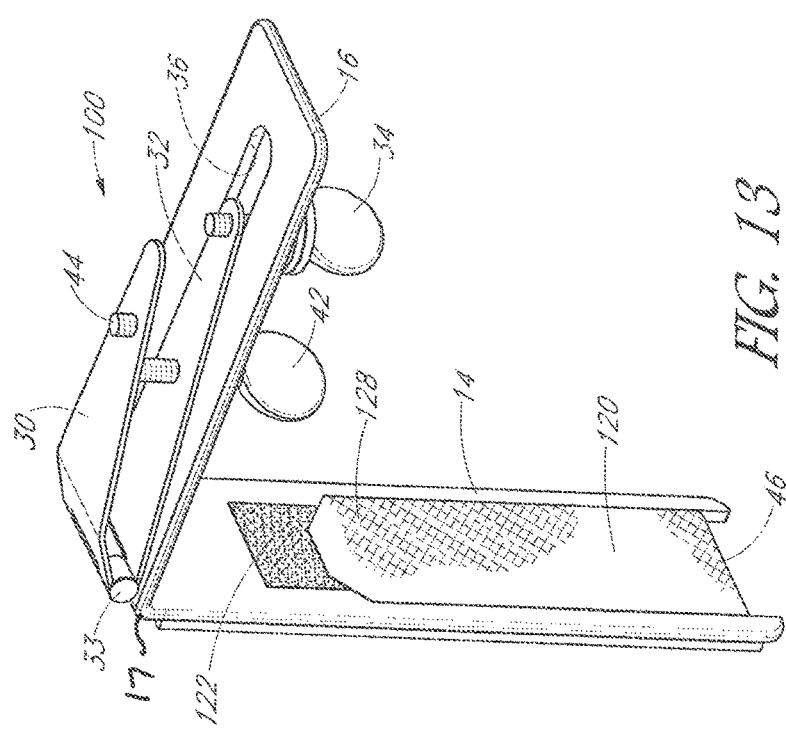

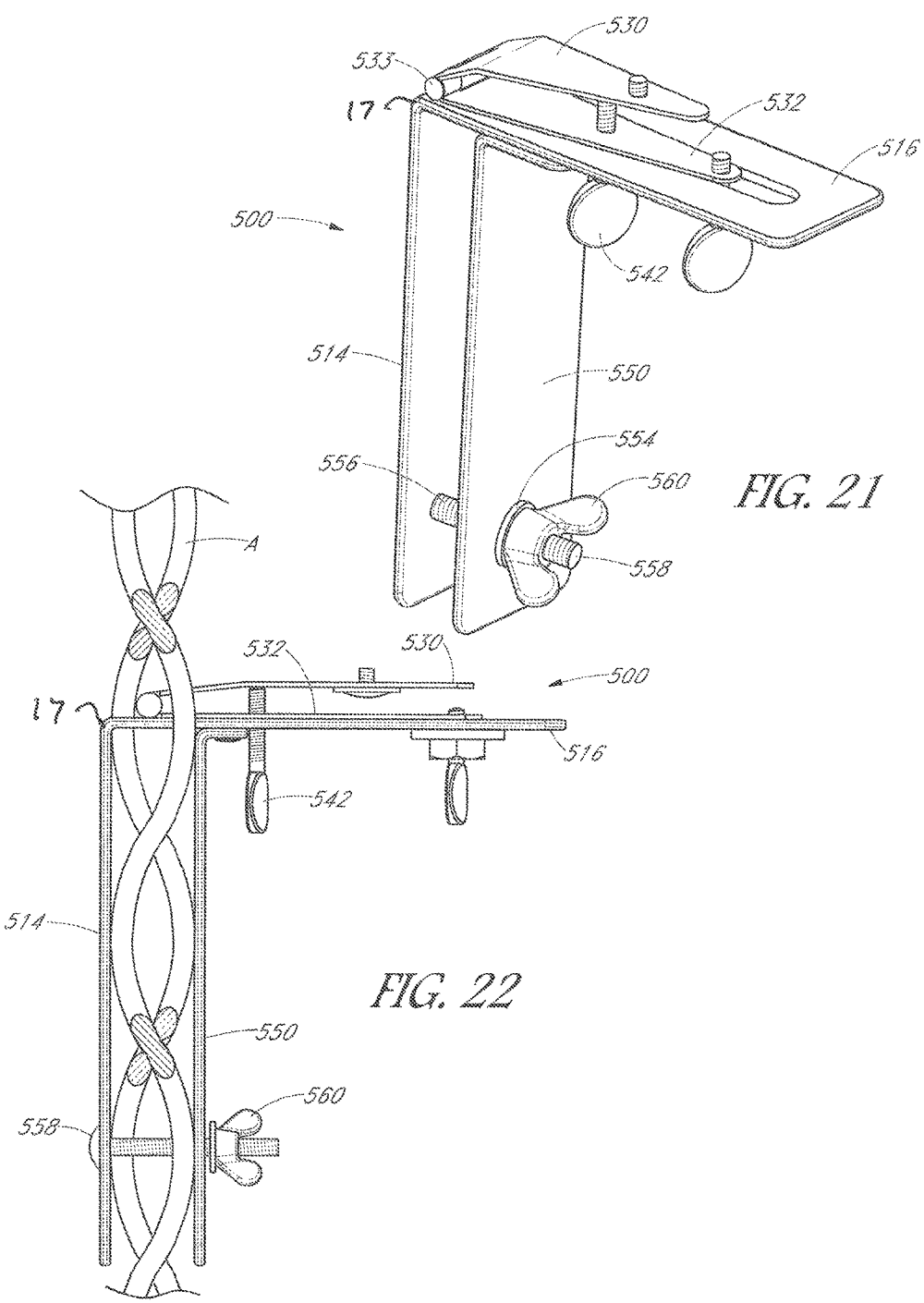

FENCE-MOUNTABLE CAMERA HOLDER

CROSS-REFERENCE TO RELATED APPLICATIONS

Not Applicable

FEDERALLY-SPONSORED RESEARCH OR DEVELOPMENT

Not Applicable

BACKGROUND

This disclosure relates to devices for mounting a handheld video or optical instrument to a structure to provide stability for the instrument while it is being used. More specifically, the present disclosure relates to a device for detachably mounting of cameras and video recording devices including, but not limited to; smartphones, tablets, cameras (including SLR, DSLR, Action, etc.) camcorders, and video cameras, to a chain link fence or similar structure. For the purposes of this disclosure, and for sake of simplicity, all such recording devices shall be referred to generically as "cameras."

At many sporting events, particularly baseball and softball games and tennis matches involving minors or amateurs, a chain-link fence or similar structure separates the spectators from the playing field. Taking unobstructed photographs or video clips from the spectator side of the fence with a hand-held still camera or video camera requires the user to hold the camera close enough to the fence to avoid imaging part of the fence. This requires the user, typically, to stand or sit close to the fence for extended periods of time if it is desired to be positioned and ready to capture a play or event. Hands generally rest on the fence and the person holding the equipment may be injured if a ball lands in the area. On the other hand, mounting the camera on a tripod or the like typically requires the camera lens to be positioned some distance behind the fence, so that the field of view of the lens will likely include parts of the fence that will often result in a partially obstructed image.

It would therefore be desirable to provide a high degree of stability for the camera, without either requiring the user to extend his or her arms and hands for potentially prolonged periods of time in a possibly uncomfortable position, or requiring the use of a free-standing camera support, such as a tripod, which may result in a compromised image.

SUMMARY

Broadly, in accordance with aspects of this disclosure, a fence-mountable camera holder comprises an L-shaped bracket having a vertical leg and a horizontal leg joined to the vertical leg at a juncture, the vertical leg having a front side defined by a front surface, and a rear side defined by a rear surface; and a fixation element on the front side of the vertical leg that is configured for detachably securing the L-bracket to a fence, particularly a chain link fence. The vertical leg is configured to be placed on the "back" (spectator) side of the fence, and is secured in place by engagement of the fixation element with the "front" (field) side of the fence, and the attachment of the fixation element with the back surface of the vertical leg through an opening in the fence. The horizontal leg of the bracket is configured for mounting a camera thereon in a position such that, when the bracket is secured to the fence, the recording device ("camera") is in a fixed position relative to the plane of the fence, with its lens close enough to an opening in the fence to have an unobstructed view of the field of play without extending through the fence into the actual field of play.

In accordance with some aspects of this disclosure, an elevation-adjustable platform may be provided on the horizontal bracket leg, the platform being configured for mounting the camera thereon. In some aspects, the vertical leg of the bracket is detachably secured to a fence by a fixation element comprising a strap having a first end fixed to the front side of the vertical leg, and a second end configured for detachable attachment to the back surface of the vertical leg after the strap is extended down the front side of the fence and then passed through a fence opening and under the lower end of the vertical leg. In some embodiments, the detachable attachment of the second end of the strap to the back surface of the vertical leg is provided by hook-and-loop fabric fasteners. In some embodiments, the detachable attachment between the second end of the strap and the vertical leg is provided by a hook near the second end of the strap that is engageable with any of a plurality of apertures in the vertical leg. In other aspects, the fixation element comprises a clamping element that is removably attachable to the vertical leg so as to capture the fence between the vertical leg and the clamping element. In some aspects, the horizontal and vertical legs of the bracket are separate elements, with the horizontal leg being pivotably attached to the vertical leg so as to be rotatable several degrees around an axis defined by the length of the horizontal leg.

As will be more fully appreciated from the detailed description below, the fence-mountable camera holders in accordance with this disclosure provide convenient, easily transportable, and easy-to-use devices for detachably mounting a camera to a chain link fence or the like, wherein the camera is held in a position in which a substantially unobstructed image of, for example, a playing field can be obtained. The several variations and embodiments described below and in the accompanying drawings allow the devices to be adapted to a wide variety of needs and preferences of the user, while maintaining a relatively simple structure that allows for relatively low cost of manufacture.

BRIEF DESCRIPTION OF THE DRAWINGS

FIG. 6 is a side elevation view of the bracket element shown in FIGS. 4 and 5.

FIG. 7 is an elevation view of the bracket element of FIGS. 4 and 5, showing the front of the vertical leg of the bracket element.

FIG. 8 is an elevation view of the bracket element of FIGS. 4 and 5, showing the back of the vertical leg of the bracket element.

FIG. 9 is a top plan view of the bracket element of FIGS. 4 and 5.

FIG. 10 is a perspective view of the elevation-adjustable platform used in some embodiments of the disclosure.

FIGS. 11 and 11A are side elevation views of the elevation-adjustable platform of FIG. 10.

FIG. 12 is a detailed view of second or hook end of a securing strap used in some embodiments of the disclosure.

FIG. 13 is a perspective view of a fence-mountable camera holder in accordance with another embodiment of the disclosure.

FIG. 14 is a side elevation view of the fence-mountable camera holder of FIG. 13.

FIG. 21 is a perspective view, taken from the back, of a fence-mountable camera holder in accordance with another embodiment of the disclosure.

FIG. 22 is a side elevation view of the fence-mountable camera holder of FIG. 21, showing the holder secured to a chain link fence.

DETAILED DESCRIPTION

Figure 1:
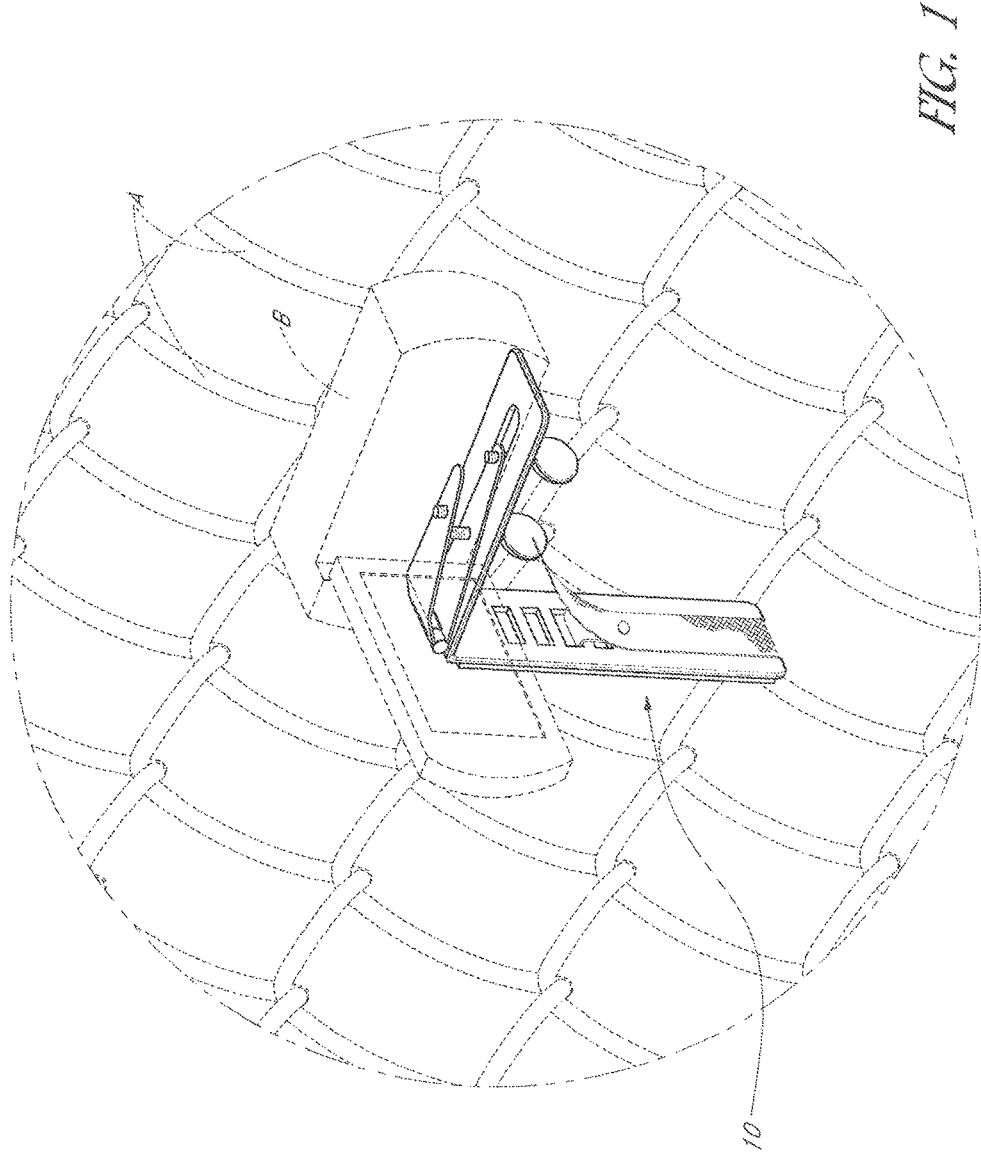
FIG. 1 is a perspective view of a fence-mountable camera holder in accordance with an embodiment of the disclosure, showing the holder attached to a chain link fence.

Referring first to FIGS. 1, 1A, 2, and 3, a fence-mountable camera holder 10 in accordance with some embodiments is shown. In FIG. 1, the holder 10, which will be described in detail below, is shown mounted on a fence A, with a camera B (e.g., a hand-held video camera) mounted on the holder 10. The view in FIG. 1 is taken from the back (spectator) side of the fence A, it being understood that the scene to be imaged by the camera B (e.g., a playing field, a sports field, a tennis court, a parade ground, an outdoor stage, or the like) would be on the opposite (front or field) side of the fence A.

The fence A is shown as a chain link fence; that is, a fence or barrier consisting of a grid of rigid, intersecting wires that define a pattern of open spaces between the wires, thereby providing what may be termed an "open grid" structure. It will be understood that the fence A represents any type of fence or barrier that provides an open grid structure comparable with that of a chain link fence.

The camera holder 10, as shown in greater detail in FIGS. 2 and 3, comprises an "L"-bracket (hereinafter "bracket") 12, having a vertical leg 14 and a horizontal leg 16 joined to the vertical leg 14 at a juncture 17, preferably at a right angle. When mounted on a fence (as in FIG. 1), the horizontal leg 16 extends rearward (toward the spectator side), while the vertical leg 14 engages the back side of the fence A.

The vertical bracket leg 14 is provided with a vertical array of apertures 18, that are preferably elongated in a direction perpendicular to the axis of the vertical leg. A retention strap 20 has a first or fixed end 22 that is attached to the top of the vertical bracket leg 14, near the juncture of the vertical leg with the horizontal leg 16. The retention strap 20 extends down along the front surface of the vertical leg 14, around the bottom end thereof, and then up the back surface of the vertical leg 14, terminating in a second or free end 24. As shown in FIG. 12, an attachment element 26, preferably configured as a hook or clasp, is attached to the retention strap a short distance (e.g., 1-2 inches or 2.5-5.0 cm) from the free end 24, leaving the portion of the strap 20 between the hook or clasp 26 and the free end 24 of the strap 20 as a gripping portion 28. The hook or clasp 26 is configured to be received any selected one of the apertures 18 to secure the holder 10 to a fence, as will be explained below.

Figure 1A:
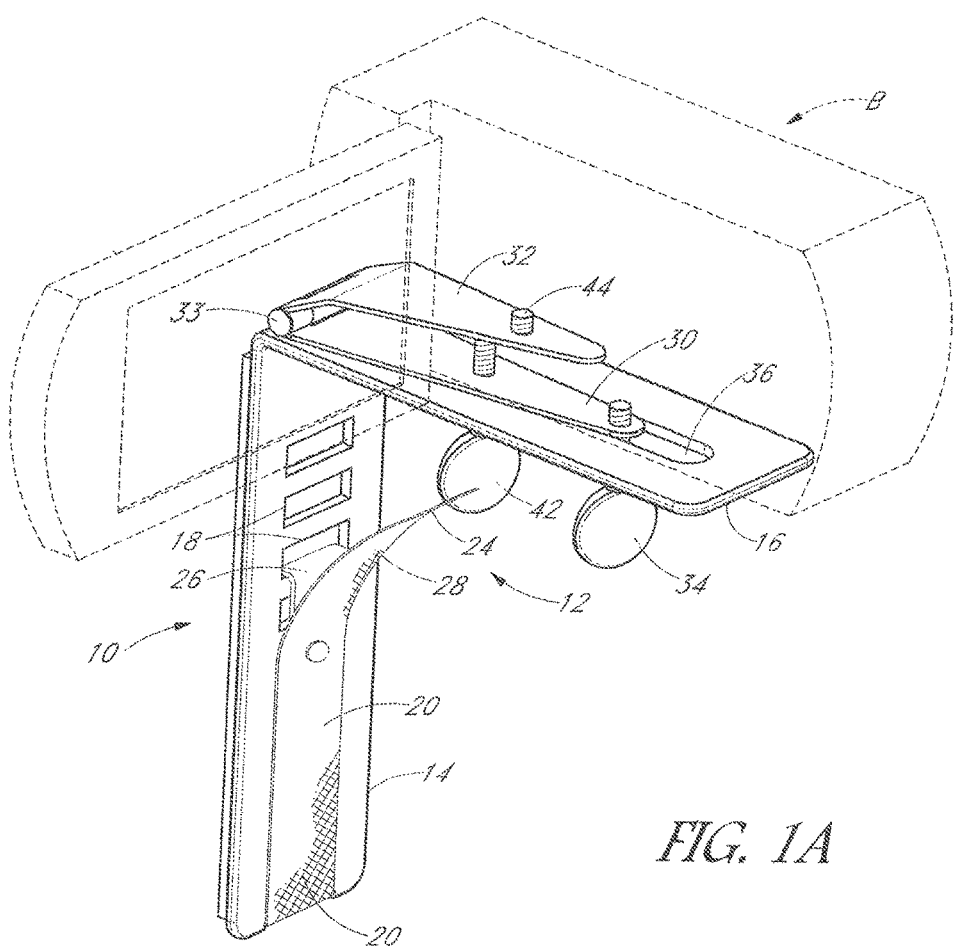
FIG. 1A is a detailed perspective view of the fence-mountable camera holder of FIG. 1.
Figure 2:
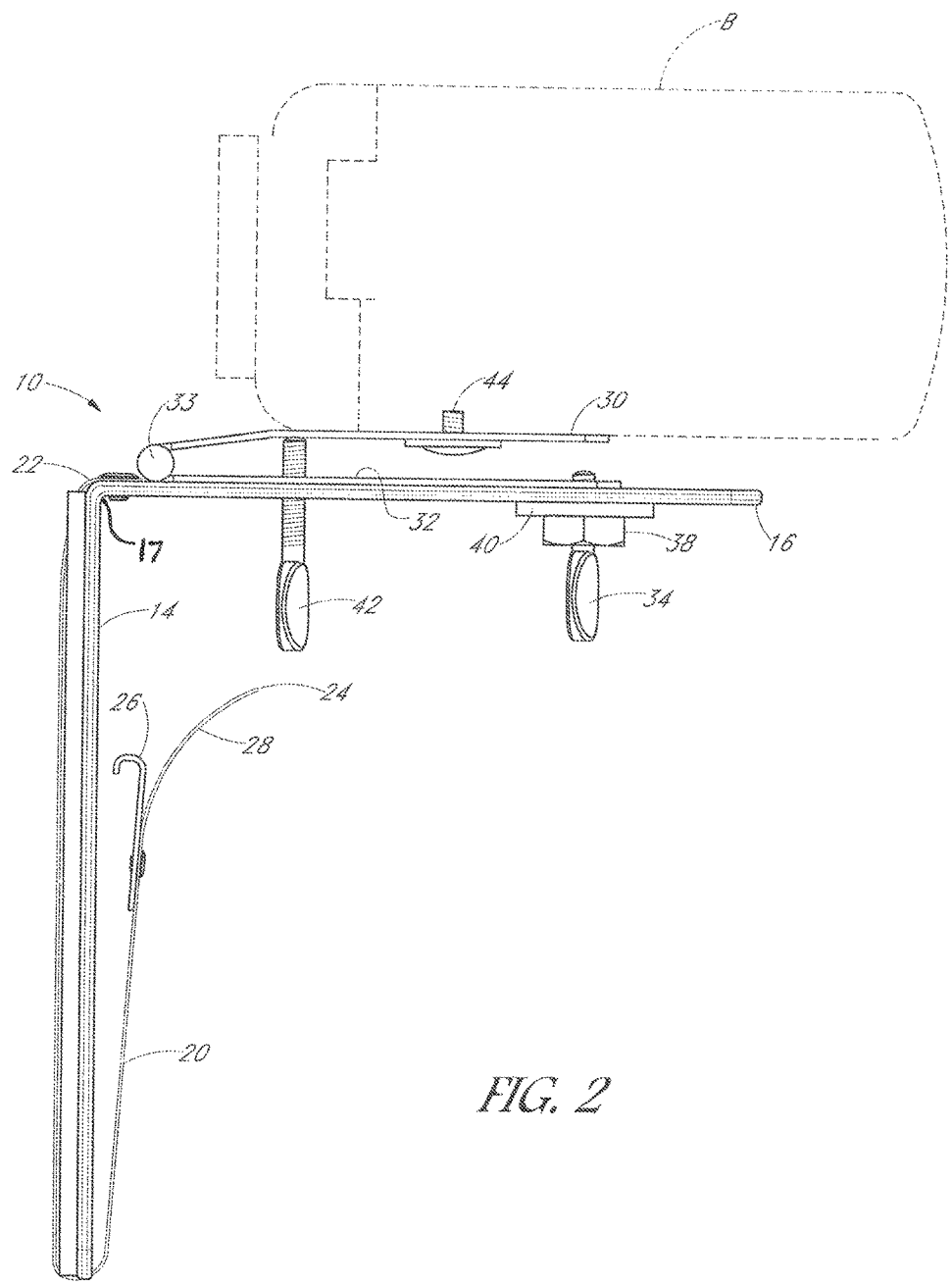
FIG. 2 is a side elevation view of the fence-mountable camera holder of FIG. 1.
Figure 3:
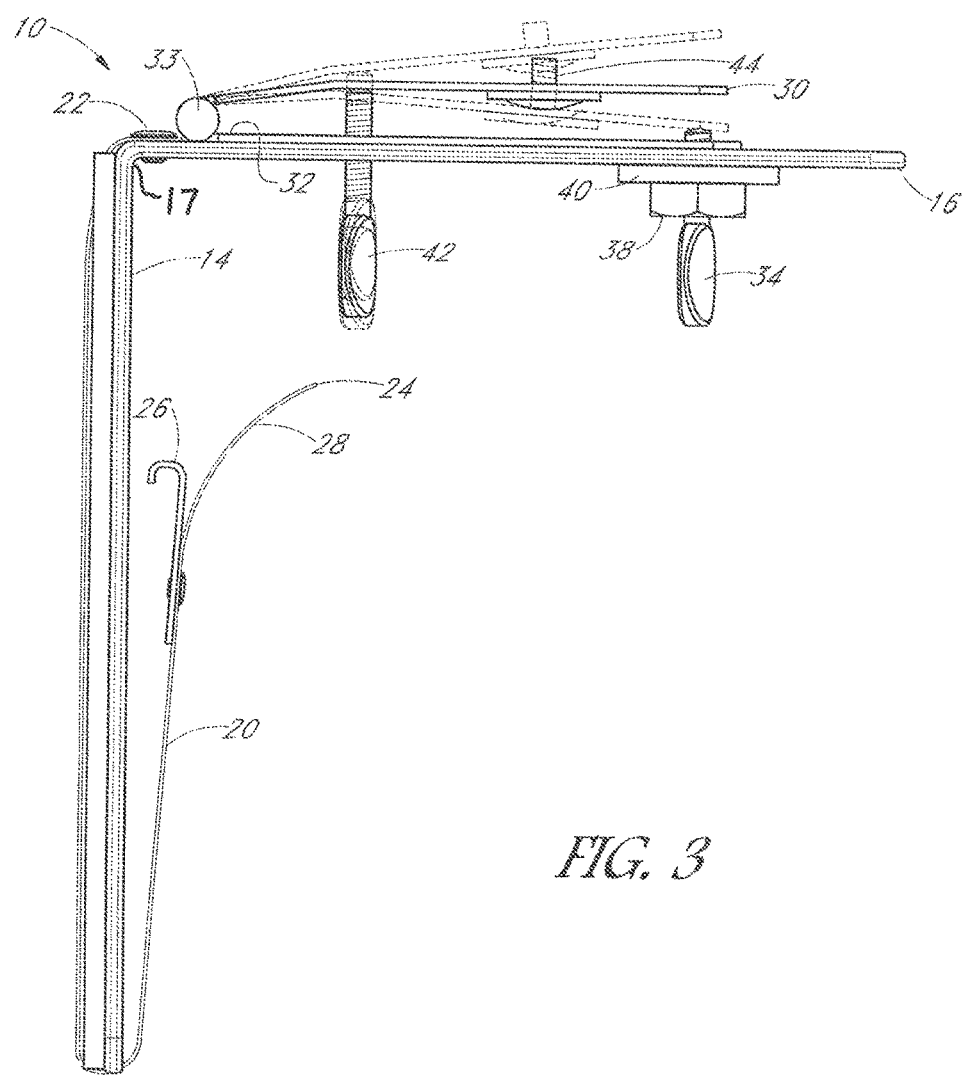
FIG. 3 is a side elevation view, similar to that of FIG. 2, showing the operation of the elevation adjustment platform in accordance with an aspect of the disclosure.
Figure 4:
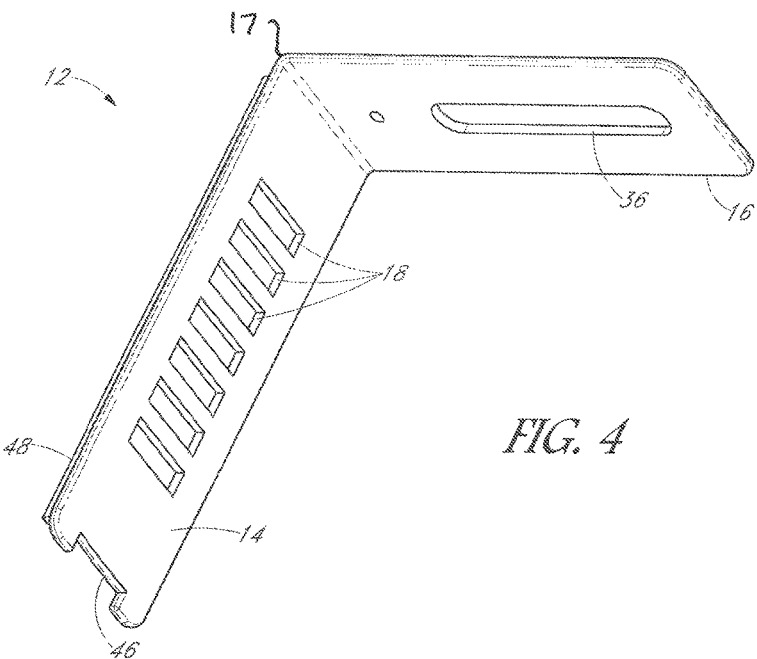
FIGS. 4 and 5 are perspective views of the bracket element of the fence-mountable camera holder of FIG. 1.
Figure 5:
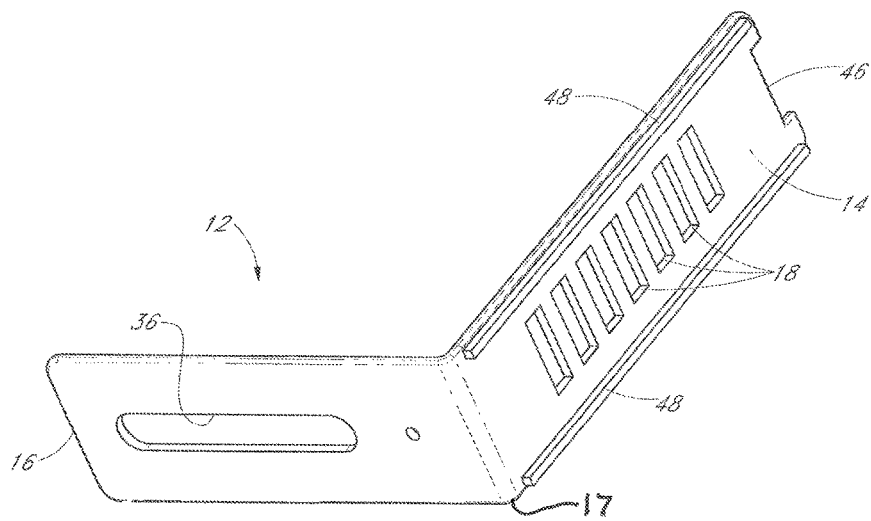

An elevation adjustment mechanism is secured to the top side of the horizontal leg 16, as shown in FIGS. 1A, 2, and 3. As also shown in detail in FIGS. 10, 11, and 11A, the elevation adjustment mechanism includes an elevation adjustment platform 30 connected to a base 32 by a hinge 33 near the bracket elbow (juncture of the horizontal and vertical bracket legs). The base 32 is secured to the horizontal bracket leg 16 by a position-adjustable attachment element, such as a first thumbscrew 34 or equivalent (e.g., a wingnut or the like). The horizontal bracket leg 16 has an axial slot 36 through which the thumbscrew 34 extends for engagement in a first aperture 35 (see FIG. 10) in the platform base 32. The slot 36 may be a closed slot, as shown, or an open-ended slot that extends to the end of the horizontal leg 16. With the first thumbscrew 34 loosened, the base 32 may be moved axially within the slot 36 to adjust the distance of the platform 30 from the bracket elbow. The position of the platform 30 on the horizontal leg 16 may be secured in the selected position by tightening the first thumbscrew 34 into a nut 38, shown with an optional washer 40. Alternatively, the first aperture 35 in the base 32 may be threaded, and the shank of the thumbscrew 34 may be threaded into the threaded first aperture 35 in the base 32.

Referring specifically to FIGS. 11 and 11A, the elevation adjustment platform 30 is formed with a bend 41 that defines a first platform portion 43a and a second platform portion 43b. The first platform portion 43a extends upwardly and rearward from the hinge 33 so as to form an acute angle with the base 32, and the second platform portion 41b extends rearward from the first platform portion 43a at the bend 41, forming an obtuse angle α with the first platform portion 43a. Thus, the platform 30 can be adjusted from a first or "open" position (FIG. 11) in which the second platform portion 43b is substantially parallel to the base 32, and a second or "closed" position (FIG. 11A) in which the second platform portion 43b forms an acute angle β with the base 32. With the platform 30 in the first or open position, a camera mounted on the platform would be aimed at an elevation of approximately 0° relative to a horizontal plane, while with the platform 30 in the second or closed position, the camera would be aimed at an elevation approximately equal to the angle β relative to the horizontal.

The elevation of the platform 30 relative to the base 32 is adjustable by an elevation adjustment element, such as a second thumbscrew 42 or equivalent, having a shank that extends through a threaded second aperture 43 (see FIG. 10) in the base 32 to engage the underside of the platform 30. As shown in FIG. 3, by tightening or loosening the second thumbscrew 42, the platform 30 may be pivoted up or down at the hinge 33, thereby providing a vertical tilt angle for the lens C of the camera B that can be adjusted downwardly from the horizontal. The camera B may be attachable to the platform 30 directly by an attachment element, such as a screw 44 that extends through an aperture 45 (see FIG. 10) in the platform 30 so as to be engageable in a threaded aperture (not shown) that is typically provided in the underside of handheld cameras and mobile telephone supports. Alternatively, any of several types of commercially-available camera mounts or adaptors (such as those used to mount a camera to a tripod or the like) may be used to removably mount a camera to the platform 30. Other mechanisms for detachably mounting a camera to the platform 30 will readily suggest themselves and are considered within the scope of this disclosure.

FIGS. 4-9 show the L-bracket 12 in detail, from the back (FIGS. 4 and 8), from the front (FIGS. 5 and 7), from the side (FIG. 6), and from the top (FIG. 9). The vertical leg 14 may advantageously be formed with a notch or cutout 46 on it bottom (free) end. The notch has a width and depth suitable to receive the strap 20 as it wraps around the bottom end of the vertical leg 14, as described above, and therefore acts a guide to reduce the likelihood that the strap will slip out of position. Similarly, the front (fence-engaging) surface of the vertical leg 14 may advantageously be provided with a pair of parallel, upraised rails 48 extending down opposite sides. The rails 48, if present, advantageously define a channel between them in which the retention strap 20 may be seated, to help keep the strap properly positioned relative to the front surface of the vertical leg 14.

The rails 48, if provided, may advantageously be made of a relatively soft, resiliently deformable material, such as a compressible polymer or rubber. Alternatively, if the rails 48 are not provided, a layer or patch (not shown) of such resilient material may be applied to the front surface of the vertical leg 14. The relatively soft, resilient material provides a cushion that may help reduce the effects on the holder and the camera, of the impact of an object, such as a ball, that may strike the fence in the vicinity of the holder. This softer material would be slightly compressed against the fence when the holder 10 is secured to the fence as described herein. This compression may also minimize the movement of the holder/camera assembly by helping to maintain the strap 20 in its proper position on the vertical leg 14, thereby further contributing to the securing of the bracket in its desired position on the fence.

In use, while the front surface of the vertical leg 14 is held adjacent to or against the back side of the fence A in the desired position, the strap 20 is inserted through an adjacent opening in the fence A, from back to front, then passed down the front side of the fence to an opening adjacent the lower end of the vertical leg 14. The strap 20 is then passed, front to back, through an adjacent opening in the fence, under the lower end of the vertical leg 14 so as to be seated in the notch 46 (if provided), and then up the back surface of the vertical leg 14 between the rails 48 until the appropriate one of the apertures 18 can be engaged by the hook or clasp 26. The selected aperture 18 should be one that provides a secure and tight engagement of the vertical leg 14 against the back side of the fence, locking the bracket 12 in place. In most (perhaps not all) cases, it will be advantageous to attach the camera to the mounting device 10 (as discussed below) after the mounting device has been secured to the fence. Detachment of the mounting device 10 from the fence is accomplished by reversing the above-described steps.

FIGS. 13 and 14 illustrate a fence-mountable camera holder 100 in accordance with another embodiment of this disclosure. The holder 100 is similar to the previously-described holder 10 shown in FIGS. 1-12, except that the holder 100 has an L-bracket 12' (FIGS. 15 and 16) configured to allow a retention strap 120 to be detachably and adjustably secured to the back side of the vertical leg 14 by hook-and-loop fabric material, of the type sold, for example, under the trademark VELCRO®. In this embodiment, the vertical leg apertures 18 and the hook or clasp 26 on the retention strap 20 described above in connection with the holder 10 of the first embodiment may be omitted.

Figure 15:
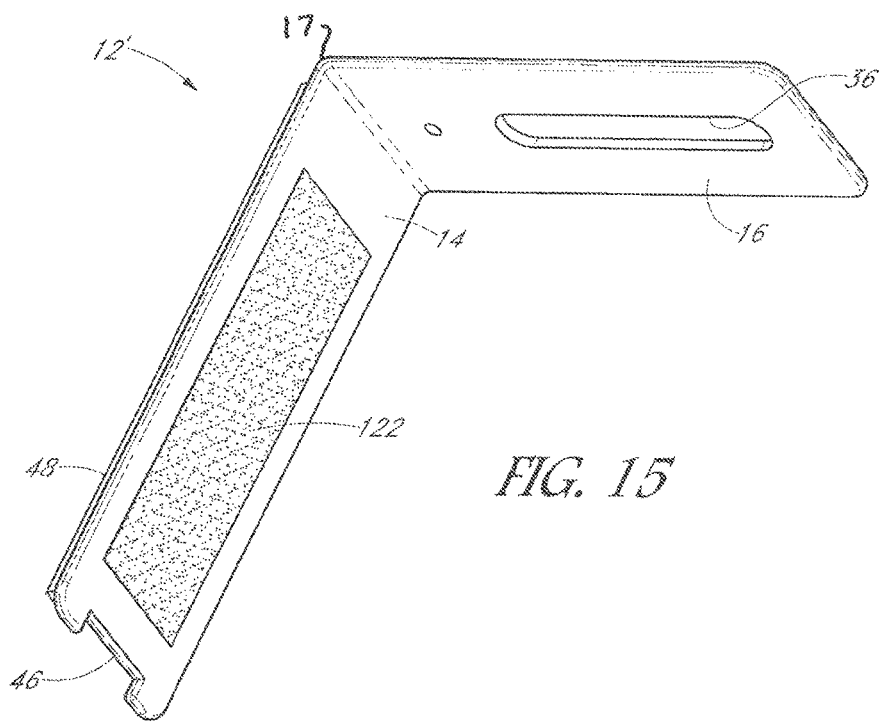
FIG. 15 is a perspective view of a bracket element used in the fence-mountable camera holder of FIG. 13, showing the bracket element from the back side.
Figure 16:
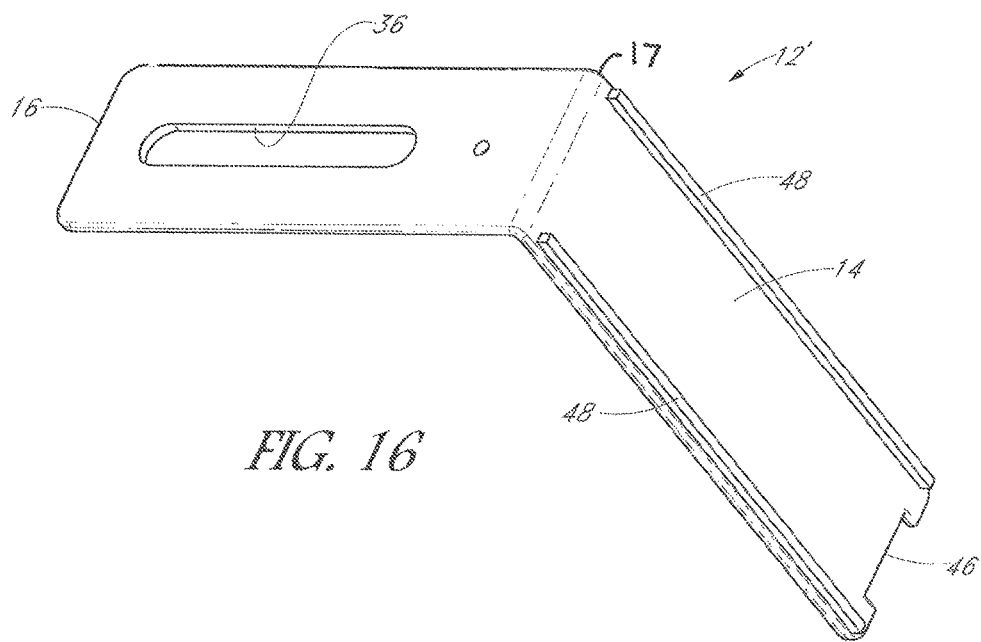
FIG. 16 is a perspective view of the bracket element of FIG. 15, showing the bracket element from the front side.

Specifically, as shown in FIGS. 13 and 15, a first fastening piece or strip 122 of hook-and-loop material is fixed to the back side of the vertical leg 14 of the holder 100, typically by a suitable adhesive. The portion of the retention strap 120 that would face the back side of the vertical leg 14 when the strap 120 is passed around the bottom of the vertical leg 14 is similarly provided with a second piece or strip 124 of hook-and-loop material, of the type that is complementary to the material of the first fastening strip 122. That is, if the first strip 122 is of the hook type, the second strip 124 would be of the loop type, and vice versa. Thus, the fastening strap 120 may be adjustably and detachably attached to the back side of the vertical leg 14 by the hook-and-loop fasteners of the first and second fastening strips 122, 124. It may be advantageous (but not necessary) for the retention strap 120 to have a free end 128 that lacks fastener material, to form a gripping portion or tab.

Attachment of the camera holder 100 to a fence is similar to the process described above with respect to the embodiment of FIGS. 1-12, except that the step of securing the strap 120 to the back surface of the vertical leg is performed by attaching the second strip 124 of hook-and-loop material to the first strip 122.

Figure 17:
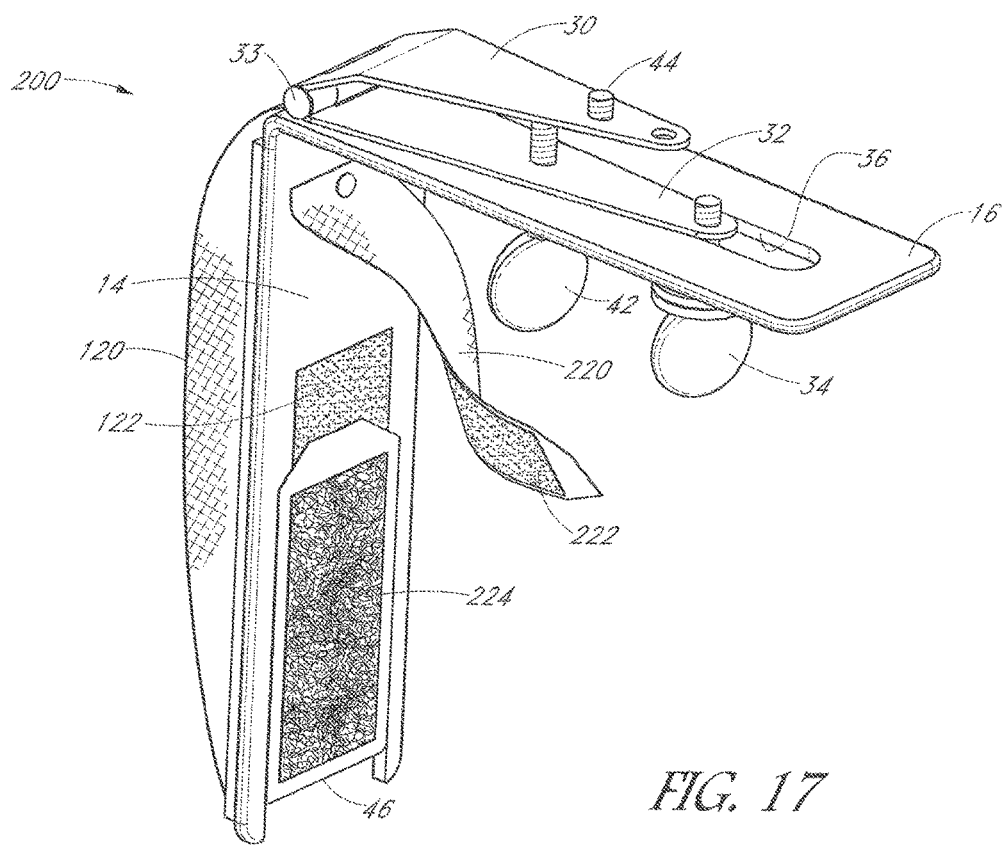
FIG. 17 is a perspective view of a fence-mountable camera hold in accordance with a variation of the embodiment of FIG. 13.

FIG. 17 illustrates a variant of the above-described embodiment of FIGS. 13-16. A fence-mountable camera holder 200 in accordance with this aspect differs from the holder 100 described above principally in the provision of a secondary or auxiliary retention strap 220 attached to the back side of the vertical leg, just below the above-described elbow. The secondary retention strap 220 is provided with a third fastening piece or strip 222 of hook-and-loop fastener material on it interior surface, i.e., the surface facing the back side of the vertical leg 14. A fourth fastening piece or strip 224 of complementary hook and loop fastening material is provided on the exterior surface (i.e., the surface facing away from the back side of the vertical leg 14), whereby the secondary retention strap 220 can be detachably fastened to the back of the retention strap 120 by means of the hook-and-loop fasteners on the third and fourth fastening strips 222, 224.

Figure 18:
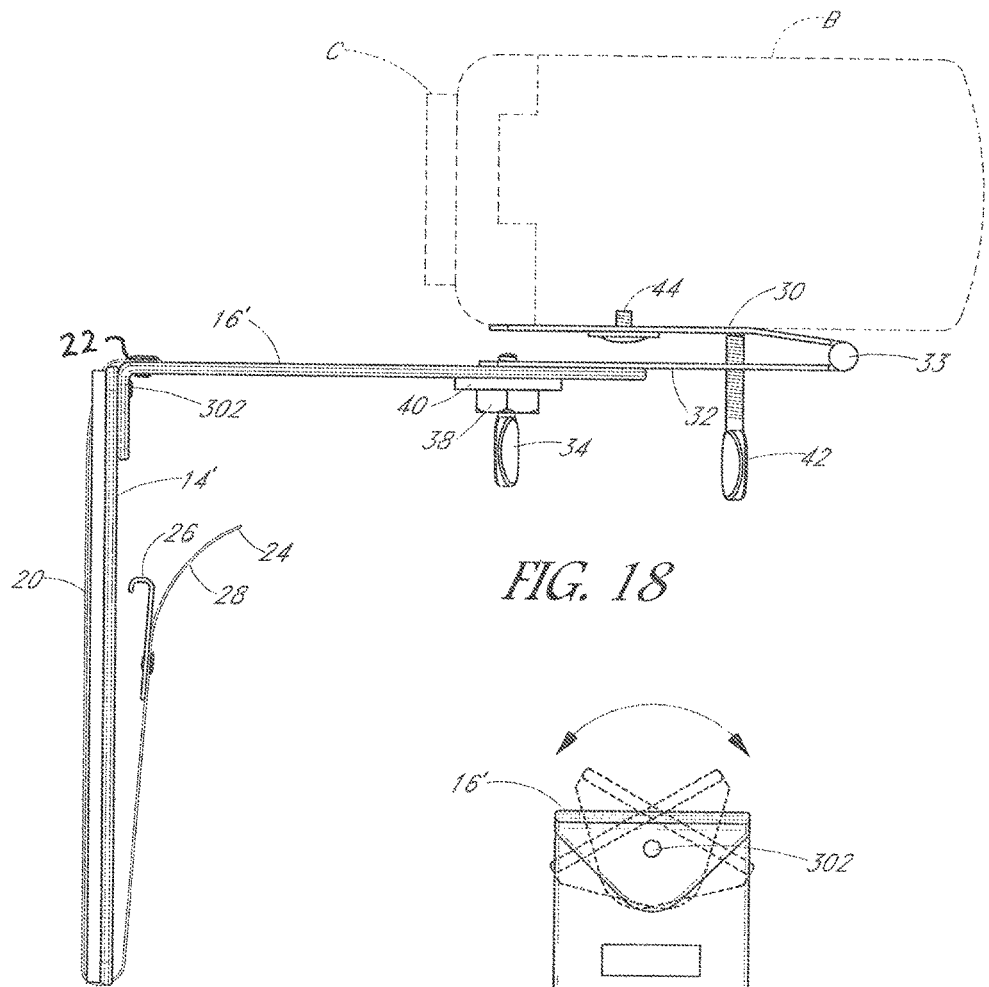
FIG. 18 is a side elevation view of a fence-mountable camera holder in accordance with another embodiment of the disclosure.
Figure 18A:
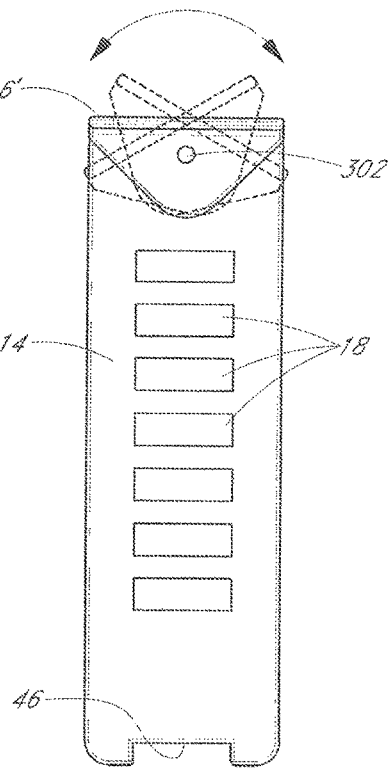
FIG. 18A is a back elevational view of the fence-mountable camera holder of FIG. 18.

FIGS. 18 and 18A show another aspect of the disclosure, in which, instead of a one-piece or unitary L-bracket, as in the embodiments described above, a fence-mountable cameral holder 300 in accordance with this aspect employs a two-piece bracket comprising a vertical leg 14' and a separate horizontal leg 16' attached by a pivot pin 302 to the vertical leg 14'. This feature allows the horizontal leg 16' to pivot around its longitudinal axis relative to the vertical leg 14', as shown in FIG. 18A, so that the camera B can be tilted in a horizontal plane relative to a fence. This feature may be useful to capture certain images, or to avoid partial obstructions due to fence structure, for example. Although this feature is shown with a retention strap 20 having a hook or clasp 26 that may be selectively engaged in one of a plurality of apertures 18 in the vertical leg 14' (as in the embodiment of FIGS. 1-12), it will be understood that this feature can be incorporated in embodiments having the hook-and-loop fastener strips, as shown in FIGS. 13-17.

FIG. 18 also illustrates another advantageous aspect of the subject matter of this disclosure. As can be seen by comparing FIG. 18 with FIG. 3, the elevation adjustment assembly can be placed in a "reverse" position on the horizontal leg 16'. That is, as shown in FIG. 18, the base 32 can be installed on the horizontal leg 16' with the hinge 33 extending rearwardly from the free end of the horizontal leg 16', instead of being located near the elbow of the L-bracket. With the elevation adjustment assembly in this "reverse" position, the camera B to be moved farther back from the fence, while also allowing the lens C of the camera B to be tilted upwardly from the horizontal by adjustment of the elevation adjustment thumbscrew 42. Again, this "reversibility" of the platform 30 can be incorporated in any of the embodiments disclosed herein.

Figure 19:
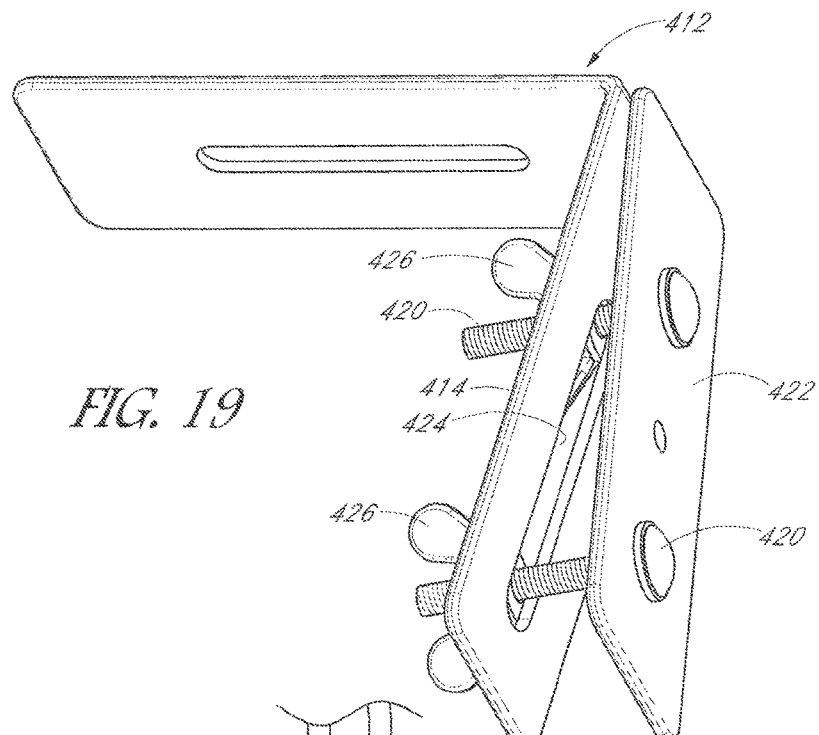
FIG. 19 is a perspective view, taken from the front, of a fence-mountable camera holder in accordance with another embodiment of the disclosure.
Figure 20:
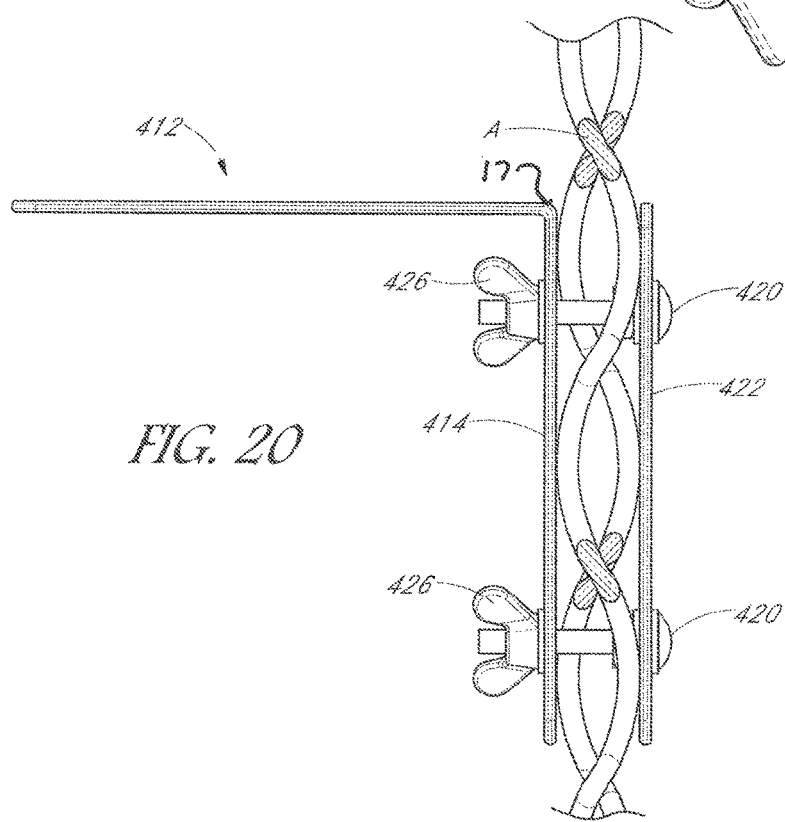
FIG. 20 is a side elevation view of the fence-mountable camera holder of FIG. 19, showing the holder secured to a chain link fence.

FIGS. 19 and 20 show still another embodiment of a fence-mountable camera holder 400 in accordance with this disclosure, in which the fixation element comprises a clamping element and clamping element attachment means. Specifically, in this embodiment, an L-bracket 412 has a vertical leg 4141 configured for the attachment of a clamping plate 422 thereto by attachment means comprising, for example, two more screws 420 and wing nuts 426 (or suitable alternatives) that are used to removably secure the clamping element 422 to the vertical leg 414. The vertical leg 414 may include an elongate slot 424, as shown, to receive the screws 420, or it may have two or more discrete apertures that are alignable with corresponding screw holes in the clamp plate 422. As shown in FIG. 20, with the vertical leg 414 engaged against the back side of a fence A, the clamp plate 422 is positioned against the front side of the fence, and the screws 420 are inserted through the holes in the clamp plate 422 and the aligned aperture(s) in the vertical leg 414. Wing nuts 426 or the like are then used to secure the clamp plate 422 to the vertical leg 414, thereby clamping the fence between the vertical leg 414 and the clamp plate 422.

FIGS. 21 and 22 illustrate still another embodiment of a fence-mountable camera holder 500 in accordance with this disclosure. In this embodiment, an L-bracket includes a vertical leg 514 and a horizontal leg 516 connected at a juncture or elbow. An elevation adjustment assembly, such as described above with respect to FIGS. 1A, 2, 3, 10, and 11, is attached to the horizontal arm 516. Thus, as described above, the elevation adjustment assembly includes a platform 530 connected at one end to a base 532 by a hinge 533, with the tilt angle of the platform 530 being adjusted by an elevation adjustment screw 542 engaging the underside of the platform 530 through the horizontal leg 516 and the base 532. In this embodiment, however, in contrast to the previously-described embodiments, the vertical leg 514 is positioned in engagement with the front side of the fence A, as shown in FIG. 22. A clamping element or plate 550, having an upper end attached to the horizontal leg 516 near the juncture or elbow 17, extends downward from the horizontal leg, spaced from the back side of the vertical leg 514, and terminates in a free end 552. The clamping plate 550 has an aperture 554 that is alignable with a corresponding aperture 556 in the vertical leg 514. With the vertical leg extending downward in engagement with the front side of the fence, the clamping plate 550 is advantageously positioned so that the fence is clamped between the vertical leg 514 and the extended clamping plate 550, as shown in FIG. 22. A clamp-fixing element, such as a screw 558, may then be inserted from the front of the fence through the aperture 556 in the vertical leg 514, and then through the aligned aperture 554 in the clamping plate 550 to secure the clamping plate 550 to the vertical leg 514. A wing nut 560 or the like can then be installed and tightened on the screw 558 to clamp the fence between the vertical leg 514 and the clamping plate 550.

It is understood that either of the clamp-type embodiments, as described above and as illustrated in FIGS. 19-22, may incorporate the rotatable horizontal leg feature described above and illustrated in FIGS. 18 and 18A. Furthermore, any of the above-described embodiments of the elevation adjustment mechanism may be employed in the mounting device embodiments of FIGS. 19-22.

Although specific embodiments of this disclosure have been described above and in the attached drawings, it is understood that these embodiments are exemplary only and not limiting. For example, features from two or more of the disclosed embodiments may be combined in ways that will suggest themselves to those skilled in the pertinent arts, while modifications and variations of the disclosed embodiments that may suggest themselves as alternatives and/or equivalents are considered within the scope of this disclosure.

What is claimed is:

1. A device for detachably mounting a camera or the like to a fence or barrier having a front side and a back side, the fence or barrier comprising an open grid structure defining a pattern of openings, the device comprising:
   an L-bracket comprising a vertical leg and a horizontal leg joined to the vertical leg at an angled juncture, the vertical leg extending from the angled juncture to a lower end and having a front side and a back side; and
   a fixation element attachable to the back side of the vertical leg from the front side of the vertical leg and configured so that, in use, when the fixation element is engaged against the front side of the fence or barrier and the front side of the vertical leg is engaged against the back side of the fence or barrier, the attachment of the fixation element to the back side of the vertical leg through an opening secures the fence or barrier between the fixation element and the front side of the vertical leg, wherein the fixation element comprises:
   a strap having a first end attached to the L-bracket at the juncture, and a second end; and
   an attachment element spaced from the second end of the strap and configured to be removably attachable to the back side of the vertical leg when the strap is passed through an opening and under the lower end of the vertical leg.

2. The device of claim 1, wherein the vertical leg includes a vertical array of apertures, and wherein the attachment element comprises a hook or clasp configured to be engaged in a selected one of the apertures.

3. The device of claim 1, wherein a first piece of hook-and-loop material is provided on the back side of the vertical leg, and wherein the attachment element comprises a second piece of hook-and-loop material, wherein the first and second pieces are complementary.

4. The device of claim 1, wherein the fixation element comprises a clamping plate attachable to the vertical leg.

5. The device of claim 1, wherein a notch is provided at the lower end of the vertical leg, the notch being configured to retain the strap.

6. The device of claim 1, further comprising a cushioning element on the front side of the vertical leg.

7. The device of claim 6, wherein the cushioning element comprises a pair of parallel rails on the front side of the vertical leg, wherein the rails define a channel therebetween configured to receive the strap.

8. The device of claim 7, wherein the rails are made of a resiliently deformable material.

9. A device for detachably mounting a camera or the like to a fence or barrier having a front side and a back side, the fence or barrier comprising an open grid structure defining a pattern of openings, the device comprising:
- a bracket comprising a vertical leg extending downward from an end of a horizontal leg to a lower end, the vertical leg having a front side and a back side; and
- a fixation element attachable to the back side of the vertical leg from the front side of the vertical leg and configured so that, in use, when the fixation element is engaged against the front side of the fence or barrier and the front side of the vertical leg is engaged against the back side of the fence or barrier, the attachment of the fixation element to the back side of the vertical leg through an opening secures the fence or barrier between the fixation element and the front side of the vertical leg;
- wherein the horizontal leg defines a longitudinal horizontal axis, and wherein the horizontal leg is rotatable about the longitudinal horizontal axis.

10. The device of claim 9, wherein the horizontal leg has a top surface, the device further comprising:
- an elevation adjustment mechanism attachable to the top surface of the horizontal leg, wherein the elevation adjustment mechanism is configured for the attachment of a camera thereto.

11. The device of claim 10, wherein the vertical leg is joined to the horizontal leg at an angled juncture, and wherein the elevation adjustment mechanism comprises:
- a base attachable to the top surface of the horizontal leg;
- an elevation adjustment platform connected to the base by a hinge located near the juncture of the horizontal and vertical legs;
- means for detachably mounting a camera on the elevation adjustment platform; and
- an elevation adjustment element engageable with the elevation adjustment platform so as to pivot the elevation adjustment platform on the hinge, thereby permitting an adjustment of the angle of the platform relative to a horizontal plane.

12. The device of claim 11, wherein the horizontal leg defines a longitudinal axis, and wherein the base is positionally adjustable along the longitudinal axis.

13. The device of claim 12, wherein the horizontal leg includes an axial slot, and wherein the base is attachable to the horizontal leg by a position-adjustable attachment element engageable with the horizontal leg through the axial slot.

14. The device of claim 11, wherein the elevation adjustment platform is formed with a bend that defines a first platform portion and a second platform portion, wherein the first platform portion extends upwardly and rearward from the hinge so as to form an acute angle with the base, and wherein the second platform portion extends rearward from the first platform portion at the bend, forming an obtuse angle with the first platform portion, whereby the platform is adjustable from a first position in which the second platform portion is substantially parallel to the base, and a second position in which the second platform portion forms an acute angle with the base.

15. A device for detachably mounting a camera or the like to a fence or barrier having a front side and a back side, the fence or barrier comprising an open grid structure defining a pattern of openings, the device comprising:
- an L-bracket comprising a vertical leg and a horizontal leg joined to the vertical leg at an angled juncture, the vertical leg extending from the angled juncture to a lower end and having a front side defined by a front surface and a back side defined by a back surface, the horizontal leg having a top surface;
- a strap having a first end attached to the L-bracket near the angled juncture and a second end removably attachable to the back surface of the vertical leg when the strap is passed down the front side of the vertical leg and around the bottom end of the vertical leg; and
- an elevation adjustment mechanism attachable to the top surface of the horizontal leg, wherein the elevation adjustment mechanism is configured for the attachment of a camera thereto.

16. The device of claim 15, wherein the elevation adjustment mechanism comprises:
- a base attachable to the top surface of the horizontal leg;
- an elevation adjustment platform connected to the base by a hinge located near the juncture of the horizontal and vertical legs;
- means for detachably mounting a camera on the elevation adjustment platform; and
- an elevation adjustment element engageable with the elevation adjustment platform so as to pivot the elevation adjustment platform on the hinge, thereby permitting an adjustment of the angle of the platform relative to a horizontal plane.

17. The device of claim 16, wherein the horizontal leg defines a longitudinal axis, and wherein the base is positionally adjustable along the longitudinal axis.

18. The device of claim 17, wherein the horizontal leg includes an axial slot, and wherein the base is attachable to the horizontal leg by a position-adjustable attachment element engageable with the horizontal leg through the axial slot.

19. The device of claim 16, wherein the elevation adjustment platform is formed with a bend that defines a first platform portion and a second platform portion, wherein the first platform portion extends upwardly and rearward from the hinge so as to form an acute angle with the base, and wherein the second platform portion extends rearward from the first platform portion at the bend, forming an obtuse angle with the first platform portion, whereby the platform is adjustable from a first position in which the second platform portion is substantially parallel to the base, and a second position in which the second platform portion forms an acute angle with the base.

20. The device of claim 15, further comprising an attachment element located on the strap at a fixed distance from the second end thereof, the attachment element being configured for detachable attachment to the back side of the vertical leg.

21. The device of claim 20, wherein the vertical leg includes a vertical array of apertures, and wherein the attachment element comprises a hook or clasp configured to be engaged in a selected one of the apertures.

22. The device of claim 20, wherein a first patch of hook-and-loop material is provided on the back surface of the vertical leg, and wherein the attachment element comprises a second patch of hook-and-loop material, wherein the first and second patches are complementary.

23. The device of claim 15, wherein a notch is provided at the lower end of the vertical leg, the notch being configured to retain the strap.

24. The device of claim 15, further comprising a cushioning element on the front surface of the vertical leg.

25. The device of claim 24, wherein the cushioning element comprises a pair of parallel rails on the front surface of the vertical leg, wherein the rails define a channel therebetween configured to receive the strap.

26. The device of claim 25, wherein the rails are made of a resiliently deformable material.

27. The device of claim 15, wherein the horizontal leg defines a longitudinal horizontal axis, and wherein the horizontal leg is rotatable about the longitudinal horizontal axis.

28. A device for detachably mounting a camera or the like to a fence or barrier having a front side and a back side, the fence or barrier comprising an open grid structure defining a pattern of openings, the device comprising:
    an L-bracket comprising a vertical leg and a horizontal leg joined to the vertical leg at an angled juncture, the vertical leg extending from the angled juncture to a lower end and having a front side defined by a front surface and a back side defined by a back surface, the horizontal leg having a top surface, wherein the horizontal leg defines a longitudinal horizontal axis, and wherein the horizontal leg is rotatable about the longitudinal horizontal axis;
    a clamping element operatively attached to the vertical leg and configured so that, in use, the clamping element is engageable with a first side of the fence and the vertical leg is engageable with a second side of the fence; and
    an elevation adjustment mechanism attachable to the top surface of the horizontal leg, wherein the elevation adjustment mechanism is configured for the attachment of a camera thereto.

29. The device of claim 28, wherein the clamping element is attachable to the vertical leg.

30. The device of claim 28, wherein the clamping element is attached to the horizontal leg near the angled juncture and extends downward therefrom so as to be spaced from the back surface of the vertical leg, the device further comprising a clamp fixing element operatively coupling the clamping element to the vertical leg.

31. The device of claim 28, wherein the elevation adjustment mechanism comprises:
    a base attachable to the top surface of the horizontal leg;
    an elevation adjustment platform connected to the base by a hinge located near the juncture of the horizontal and vertical legs;
    means for detachably mounting a camera on the elevation adjustment platform; and
    an elevation adjustment element engageable with the elevation adjustment platform so as to pivot the elevation adjustment platform on the hinge, thereby permitting an adjustment of the angle of the platform relative to a horizontal plane.

32. The device of claim 31, wherein the horizontal leg defines a longitudinal axis, and wherein the base is positionally adjustable along the longitudinal axis.

33. The device of claim 32, wherein the horizontal leg includes an axial slot, and wherein the base is attachable to the horizontal leg by a position-adjustable attachment element engageable with the horizontal leg through the axial slot.

34. The device of claim 31, wherein the elevation adjustment platform is formed with a bend that defines a first platform portion and a second platform portion, wherein the first platform portion extends upwardly and rearward from the hinge so as to form an acute angle with the base, and wherein the second platform portion extends rearward from the first platform portion at the bend, forming an obtuse angle with the first platform portion, whereby the platform is adjustable from a first position in which the second platform portion is substantially parallel to the base, and a second position in which the second platform portion forms an acute angle with the base.

35. A device for detachably mounting a camera or the like to a fence or barrier having a front side and a back side, the fence or barrier comprising an open grid structure defining a pattern of openings, the device comprising:
    a bracket comprising a horizontal leg having first and second ends, and a vertical leg extending downward from the first end of the horizontal leg to a lower end, the vertical leg having a front side defined by a front surface and a back side defined by a back surface, the horizontal leg having a top surface;
    a clamping element operatively attached to the vertical leg and configured so that, in use, the clamping element is engageable with a first side of the fence and the vertical leg is engageable with a second side of the fence; and
    an elevation adjustment mechanism attachable to the horizontal leg, wherein the elevation adjustment mechanism comprises:
    a platform operably connected to the horizontal leg by a hinge;
    a mounting element on the platform configured for removable attachment of a camera thereto; and
    an elevation adjustment element engageable with the platform and operable to pivot the platform on the hinge, thereby permitting an adjustment of the angle of the platform relative to a horizontal plane.

36. The device of claim 35, wherein the elevation adjustment mechanism further comprises a base attachable to the top surface of the horizontal leg, wherein the hinge is located near the first end of the horizontal leg, and wherein the hinge operably connects the platform to the base.

37. The device of claim 35, wherein the clamping element is attachable to the vertical leg.

38. The device of claim 35, wherein the clamping element is attached to the horizontal leg near the first end of the horizontal leg and extends downward therefrom so as to be spaced from the back surface of the vertical leg, the device further comprising a clamp fixing element operatively coupling the clamping element to the vertical leg.

39. The device of claim 36, wherein the horizontal leg defines a longitudinal axis, and wherein the base is positionally adjustable along the longitudinal axis.

40. The device of claim 39, wherein the horizontal leg includes an axial slot, and wherein the base is attachable to the horizontal leg by a position-adjustable attachment element engageable with the horizontal leg through the axial slot.

41. The device of claim 36, wherein the platform is formed with a bend that defines a first platform portion and a second platform portion, wherein the first platform portion extends upwardly and rearward from the hinge so as to form an acute angle with the base, and wherein the second platform portion extends rearward from the first platform portion at the bend, forming an obtuse angle with the first platform portion, whereby the platform is adjustable from a first position in which the second platform portion is substantially parallel to the base, and a second position in which the second platform portion forms an acute angle with the base.

42. The device of claim 35, wherein the horizontal leg defines a longitudinal horizontal axis, and wherein the horizontal leg is rotatable about the longitudinal horizontal axis.

* * * * *